United States Patent
Ma (10) Patent No.: US 12,019,491 B2
(45) Date of Patent: Jun. 25, 2024

(54) PROTECTION SYSTEM AND METHOD FOR ABNORMAL POWER DOWN OF CHILD NODE IN RACK-SCALE SERVER, AND APPARATUS

(71) Applicants: SHANDONG MASS INFORMATION TECHNOLOGY RESEARCH INS, Shandong (CN); INSPUR ELECTRONIC INFORMATION INDUSTRY CO., LTD., Shandong (CN)

(72) Inventor: Yichao Ma, Shandong (CN)

(73) Assignees: SHANDONG MASS INFORMATION TECHNOLOGY RESEARCH INS, Shandong (CN); INSPUR ELECTRONIC INFORMATION INDUSTRY CO., LTD., Shandong (CN)

(*) Notice: Subject to any disclaimer, the term of this patent is extended or adjusted under 35 U.S.C. 154(b) by 0 days.

(21) Appl. No.: 18/250,948

(22) PCT Filed: Sep. 28, 2021

(86) PCT No.: PCT/CN2021/121424
§ 371 (c)(1),
(2) Date: Apr. 27, 2023

(87) PCT Pub. No.: WO2022/134715
PCT Pub. Date: Jun. 30, 2022

(65) Prior Publication Data
US 2023/0384850 A1 Nov. 30, 2023

(30) Foreign Application Priority Data
Dec. 22, 2020 (CN) .......................... 202011532924.8

(51) Int. Cl.
*G06F 1/30* (2006.01)
*G06F 1/26* (2006.01)

(52) U.S. Cl.
CPC ................ *G06F 1/30* (2013.01); *G06F 1/266* (2013.01)

(58) Field of Classification Search
CPC .................................. G06F 1/30; G06F 1/266
See application file for complete search history.

(56) References Cited

U.S. PATENT DOCUMENTS 5,664,966 A * 9/1997 Maegawa .......... H01R 13/4364
439/595
10,506,718 B2 * 12/2019 Zhao .................. G01R 31/2818
(Continued)

FOREIGN PATENT DOCUMENTS

| CN | 109669905 A | 4/2019 |
| CN | 111258403 A | 6/2020 |

(Continued)

OTHER PUBLICATIONS

Search report for PCT/CN2021/121424 mailed on Dec. 31, 2021.
Search report for Chinese application 202011532924.8, filed Dec. 22, 2020.

*Primary Examiner* — Aurel Prifti
(74) *Attorney, Agent, or Firm* — Dennemeyer & Associates LLC; Victoria Friedman (57) ABSTRACT

A protection system for abnormal power down of a child node in a rack-scale server includes a logic control module and a plugging/unplugging trigger module. The plugging/unplugging trigger module is configured to detect a contact state, at a second plugging depth, between a power supplying clamp of the child node and the power supplying copper bar through a metal probe, generate a detection signal by conversion, and send the detection signal to the logic control module; the logic control module is configured to succes- (Continued)

sively turn off a main power supply and a standby power supply of the child node after determining that the power supplying clamp is disengaged from the second plugging depth of the power supplying copper bar and before the power supplying clamp is disengaged from the third plugging depth of the power supplying copper bar, so as to execute power down logic of normal power off.

19 Claims, 4 Drawing Sheets

(56) References Cited

U.S. PATENT DOCUMENTS

| | | | |
|---|---|---|---|
| 10,616,997 B2 * | 4/2020 | Li | G02F 1/1309 |
| 11,082,243 B2 * | 8/2021 | Wendt | H04L 12/40045 |
| 2006/0119368 A1 * | 6/2006 | Sela | G01R 31/54 |
| | | | 324/522 |
| 2011/0122663 A1 * | 5/2011 | Huang | H02H 9/004 |
| | | | 363/50 |
| 2015/0054536 A1 * | 2/2015 | Rackley | G01R 31/70 |
| | | | 324/750.18 |
| 2015/0316262 A1 * | 11/2015 | Immer | F23N 5/00 |
| | | | 431/2 |
| 2017/0093148 A1 | 3/2017 | Wang | |
| 2018/0138707 A1 * | 5/2018 | Xie | H01R 13/6683 |
| 2018/0375258 A1 * | 12/2018 | Scannelli | H01R 13/6315 |
| 2021/0048871 A1 * | 2/2021 | Sato | G06T 7/33 |
| 2022/0029416 A1 * | 1/2022 | Wendt | H05B 45/30 |

FOREIGN PATENT DOCUMENTS

| | | |
|---|---|---|
| CN | 111625079 A | 9/2020 |
| CN | 111722000 A | 9/2020 |
| CN | 112612357 A | 4/2021 |
| WO | 2021159651 A1 | 8/2021 |

* cited by examiner

PROTECTION SYSTEM AND METHOD FOR ABNORMAL POWER DOWN OF CHILD NODE IN RACK-SCALE SERVER, AND APPARATUS

CROSS-REFERENCE TO RELATED APPLICATIONS

This is a 35 U.S.C. 371 National Stage Patent Application of International Application No. PCT/CN2021/121424, filed Sep. 28, 2021, which claims priority to Chinese application 202011532924.8, filed Dec. 22, 2020, each of which is hereby incorporated by reference in its entirety.

TECHNICAL FIELD

The present disclosure relates to the technical field of electronics, and in particular to a protection system and method for abnormal power down of a child node in a rack-scale server, an electronic apparatus, and a computer-readable storage medium.

BACKGROUND

In the industry of servers, a 1+1 redundant design for Common Redundant Power Supplies (CRPS) is generally adopted for power supplying of a single-node server, that is, when one CRPS goes wrong or undergoes abnormal power down, the other CRPS may supply power to the whole server node separately so as to protect server data against loss due to power failure or abnormal power down.

However, in a rack-scale server, power is supplied to each child node server generally by a power supplying copper bar at a rear end of the rack (sometime also referred to as cabinet), and the power supplying copper bar supplies power to all of child nodes in the rack-scale server simultaneously. Once a power supplying clamp of the child node is disengaged from the power supplying copper bar, the system of the child node server is powered down directly. Therefore, unlike a single-node server, the power supply 1+1 redundant design cannot be implemented for the rack-scale server.

Generally, in a normal power off operation, a user presses a power switch of the child node first, a main power supplying network of the system is powered down in order (for example, a standby power supply is turned off after a main power supply is turned off completely) according to a preset time sequence, and an operation such as data storage and the like is completed in the process of power down in order, thereby avoiding the loss of the server data.

However, in a machine room of the rack-scale server, a maintenance engineer usually pulls out a child node case directly without pressing the power switch when the server is in normal operation, resulting in abnormal power down. The situation causes that an input power supply at a mainboard end of the child node falls from a normal working voltage to a zero voltage directly, all levels of power supplying networks at the main-board end shut down automatically due to under-voltage protection, therefore, the standby power supply of the child node and the main power supply of the system are turned off simultaneously, an initial power off and power down time sequence of the system is not followed, thereby resulting in the loss of data in a child node system. Meanwhile, abnormal power down of a power supply unit in the child node when the power supply unit is supplying power to a load may generate a reverse voltage within a short period of time, thereby damaging sensitive electronic components in the system.

In view of this, those having ordinary skill in the art need to provide a solution for solving the above technical problem.

SUMMARY

Embodiments of the present disclosure provide a protection system and method for abnormal power down of a child node in a rack-scale server, an electronic apparatus and a computer-readable storage medium, which may effectively deal with an abnormal power down issue caused by pulling out a child node server of which the system is running a load, thereby preventing the loss of system data and the damage to sensitive components.

An aspect of the embodiments of the present disclosure provides a protection system for abnormal power down of a child node in a rack-scale server. Power is supplied to each child node of the rack-scale server through a power supplying copper bar. The protection system for abnormal power down includes a logic control module and a plugging/unplugging trigger module.

The plugging/unplugging trigger module is configured to detect a contact state, at a second plugging depth, between a power supplying clamp of the child node and the power supplying copper bar through a metal probe, generate a detection signal by conversion, and send the detection signal to the logic control module. The second plugging depth is greater than a third plugging depth and not greater than a first plugging depth, the first plugging depth corresponds to a maximum pluggable depth of the power supplying copper bar, and the third plugging depth corresponds to a shallow edge of the power supplying copper bar.

The logic control module is configured to successively turn off a main power supply and a standby power supply of the child node after determining, according to the detection signal, that the power supplying clamp is disengaged from the second plugging depth of the power supplying copper bar and before the power supplying clamp is disengaged from the third plugging depth of the power supplying copper bar, such that the child node executes power down logic of normal power off.

In some exemplary implementations, the plugging/unplugging trigger module includes the metal probe and a level switching circuit connected with a first end of the metal probe.

The metal probe is installed in parallel to the power supplying clamp of the child node, and a protruding distance from a second end of the metal probe to a shell is smaller than a protruding distance from the power supplying clamp to the shell, such that, when the power supplying clamp is inserted into the second plugging depth of the power supplying copper bar, the second end of the metal probe is just in contact with the third plugging depth of the power supplying copper bar.

In some exemplary implementations, the level switching circuit includes a pull-up resistor and a controllable grounding switch which are connected. A common end of the pull-up resistor and the controllable grounding switch, as an output end of the level switching circuit, is connected with the logic control module.

The other end of the pull-up resistor is connected with the standby power supply. The other end of the controllable grounding switch is grounded.

A control end of the controllable grounding switch is connected with the first end of the metal probe. When the second end of the metal probe is in contact with the third plugging depth of the power supplying copper bar, the controllable grounding switch is driven to switch on; and when the second end of the metal probe is suspended in the air, the controllable grounding switch is switched off.

In some exemplary implementations, the power supplying copper bar includes a power supply bus-bar and a grounding bus-bar. The metal probe is installed on the shell and corresponding to the power supply bus-bar, such that, when the power supplying clamp is inserted into the second plugging depth of the power supplying copper bar, the second end of the metal probe is just in contact with the third plugging depth of the power supplying copper bar. The controllable grounding switch is a N-channel Metal Oxide Semiconductor (NMOS) transistor.

In some exemplary implementations, the logic control module includes a Complex Programmable Logic Device (CPLD) on a main-board of the child node.

In some exemplary implementations, the CPLD is connected with a power button of the child node. The CPLD is further configured to:

successively turn off the main power supply and the standby power supply after reception of a power off command from the power button.

In some exemplary implementations, the logic control module further includes a Baseboard Management Controller (BMC) on the main-board of the child node. The BMC is further configured to:

after determining, according to the detection signal, that the power supplying clamp is disengaged from the second plugging depth of the power supplying copper bar, generate a log record for current abnormal power down.

Another aspect of the embodiments of the present disclosure provides a protection method for abnormal power down of a child node in a rack-scale server. Power is supplied to each child node of the rack-scale server through a power supplying copper bar. The method is applied to a logic control module connected with a main power supply and a standby power supply of the child node and includes the following operations.

A detection signal sent by a plugging/unplugging trigger module is received in real time. The plugging/unplugging trigger module is configured to detect a contact state, at a second plugging depth, between a power supplying clamp of the child node and the power supplying copper bar through a metal probe, and generate the detection signal by conversion. A second plugging depth is greater than a third plugging depth and not greater than a first plugging depth, the first plugging depth corresponds to a maximum pluggable depth of the power supplying copper bar, and the third plugging depth corresponds to a shallow edge of the power supplying copper bar.

Whether the power supplying clamp is disengaged from the second plugging depth of the power supplying copper bar or not is determined according to the detection signal.

In responsive to determining that the power supplying clamp is disengaged from the second plugging depth of the power supplying copper bar, before the power supplying clamp is disengaged from the third plugging depth of the power supplying copper bar, the main power supply and the standby power supply are successively turned off, such that the child node executes power down logic of normal power off.

In some exemplary implementations, the plugging/unplugging trigger module includes a metal probe and a level switching circuit connected with a first end of the metal probe.

The metal probe is installed in parallel to the power supplying clamp of the child node, and a protruding distance from a second end of the metal probe to a shell is smaller than a protruding distance from the power supplying clamp to the shell, such that, when the power supplying clamp is inserted into the second plugging depth of the power supplying copper bar, a second end of the metal probe is just in contact with the third plugging depth of the power supplying copper bar.

In some exemplary implementations, the level switching circuit includes a pull-up resistor and a controllable grounding switch which are connected; and a common end of the pull-up resistor and the controllable grounding switch, as an output end of the level switching circuit, is connected with the logic control module.

The other end of the pull-up resistor is connected with the standby power supply; and the other end of the controllable grounding switch is grounded.

A control end of the controllable grounding switch is connected with the first end of the metal probe. When the second end of the metal probe is in contact with the third plugging depth of the power supplying copper bar, the controllable grounding switch is driven to switch on; and when the second end of the metal probe is suspended in the air, the controllable grounding switch is switched off.

In some exemplary implementations, the power supplying copper bar includes a power supply bus-bar and a grounding bus-bar. The metal probe is installed on the shell, corresponding to the power supply bus-bar, such that, when the power supplying clamp is inserted into the second plugging depth of the power supplying copper bar, the second end of the metal probe is just in contact with the third plugging depth of the power supplying copper bar. The controllable grounding switch is an NMOS transistor.

In some exemplary implementations, the logic control module includes a CPLD on a main-board of the child node.

In some exemplary implementations, the CPLD is connected with a power button of the child node. The method further includes the following operation.

The main power supply and the standby power supply are successively turned off after reception of a power off command from the power button.

In some exemplary implementations, the logic control module further includes a BMC on the main-board of the child node. The method further includes the following operation.

After determining, according to the detection signal, that the power supplying clamp is disengaged from the second plugging depth of the power supplying copper bar, the BMC generates a log record for current abnormal power down.

Still another aspect of the embodiments of the present disclosure provides an electronic apparatus, which includes a memory and a processor.

The memory is configured to store a computer program.

The processor is configured to execute the computer program so as to implement the above operations of the protection method for abnormal power down of the child node in the rack-scale server.

Yet another aspect of the embodiments of the present disclosure provides a computer-readable storage medium, in which a computer program is stored; and when being executed by a processor, the computer program is configured to cause the processor to implement the above operations of a protection method for abnormal power down of a child node in a rack-scale server.

The protection system for abnormal power down of the child node in the rack-scale server according to the embodiments of the present disclosure includes a logic control module and a plugging/unplugging trigger module. The plugging/unplugging trigger module is configured to detect a contact state, at a second plugging depth, between a power supplying clamp of the child node and the power supplying copper bar through a metal probe, generate a detection signal by conversion, and send the detection signal to the logic control module, wherein the second plugging depth is greater than a third plugging depth and not greater than a first plugging depth, the first plugging depth corresponds to a maximum pluggable depth of the power supplying copper bar, and the third plugging depth corresponds to a shallow edge of the power supplying copper bar. The logic control module is configured to successively turn off a main power supply and a standby power supply of the child node after determining, according to the detection signal, that the power supplying clamp is disengaged from the second plugging depth of the power supplying copper bar and before the power supplying clamp is disengaged from the third plugging depth of the power supplying copper bar, such that the child node executes power down logic of normal power off.

The protection system and method for abnormal power down of the child node in the rack-scale server, the electronic apparatus and the computer-readable storage medium provided in the embodiments of the present disclosure have the following beneficial effects. When the child node server is pulled out by mistake, an early stage of a process of separation of the power supplying clamp and the power supplying copper bar may be detected based on the metal probe, so that by using the time opportunity during the separation process, the main power supply and the standby power supply are successively controlled to turn off before complete power down so as to realize the power down logic of normal power off, thereby effectively avoiding the loss of system data, preventing a reverse voltage caused by abnormal power down from damaging sensitive electronic components in the system, thus guaranteeing the safety of system circuits.

BRIEF DESCRIPTION OF THE DRAWINGS

In order to more clearly illustrate technical solutions in a related art and the embodiments of the present disclosure, the drawings used in descriptions of the related art and the embodiments of the present disclosure will be briefly described below. It is apparent that the drawings described about the embodiments of the present disclosure are only some embodiments of the present disclosure. Other drawings may further be obtained by those having ordinary skill in the art according to these drawings without creative efforts and shall fall within the scope of protection of the present disclosure.

DETAILED DESCRIPTION

The embodiments of the present disclosure provide a protection system and method for abnormal power down of a child node in a rack-scale server, an electronic apparatus and a computer-readable storage medium, which may effectively deal with an abnormal power down issue caused by pulling out a child node server of which the system is running a load, thereby preventing the loss of system data and the damage to sensitive components.

In order to more clearly and completely illustrate technical solutions in the embodiments of the present disclosure, the technical solutions in the embodiments of the present disclosure will be described below in combination with the drawings in the embodiments of the present disclosure. All other embodiments obtained by those having ordinary skill in the art based on the embodiments in the present disclosure without creative work shall fall within the scope of protection of the present disclosure.

In a rack-scale server, power is supplied to each child node server generally by a power supplying copper bar at a rear end of the rack (sometimes also referred to as cabinet), and the power supplying copper bar supplies power to all of child nodes in the rack-scale server simultaneously. Once a power supplying clamp of the child node is disengaged from the power supplying copper bar, the system of the child node server is powered down directly. Therefore, unlike a single-node server, the power supply 1+1 redundant design cannot be implemented for the rack-scale server.

Generally, in a normal power off operation, a user presses a power switch of the child node first, a main power supplying network of the system is powered down in order (for example, a standby power supply is turned off after a main power supply is turned off completely) according to a preset time sequence, and an operation such as data storage and the like is completed in the process of power down in order, thereby avoiding the loss of the server data.

However, in a machine room of the rack-scale server, a maintenance engineer usually pulls out a child node case directly without pressing the power switch when the server is in normal operation, resulting in abnormal power down. The situation causes that an input power supply at a main-board end of the child node falls from a normal working voltage to a zero voltage directly, all levels of power supplying networks at the main-board end shut down automatically due to under-voltage protection, therefore, the standby power supply of the child node and the main power supply of the system are turned off simultaneously, an initial power off and power down time sequence of the system is not followed, thereby resulting in the loss of data in a child node system. Meanwhile, abnormal power down of a power supply unit in the child node when the power supply unit is supplying power to a load may generate a reverse voltage within a short period of time, thereby damaging sensitive electronic components in the system.

In view of this, the embodiments of the present disclosure provide a protection solution for abnormal power down of a child node in a rack-scale server, which may effectively solve the above technical problem.

Figure 1:
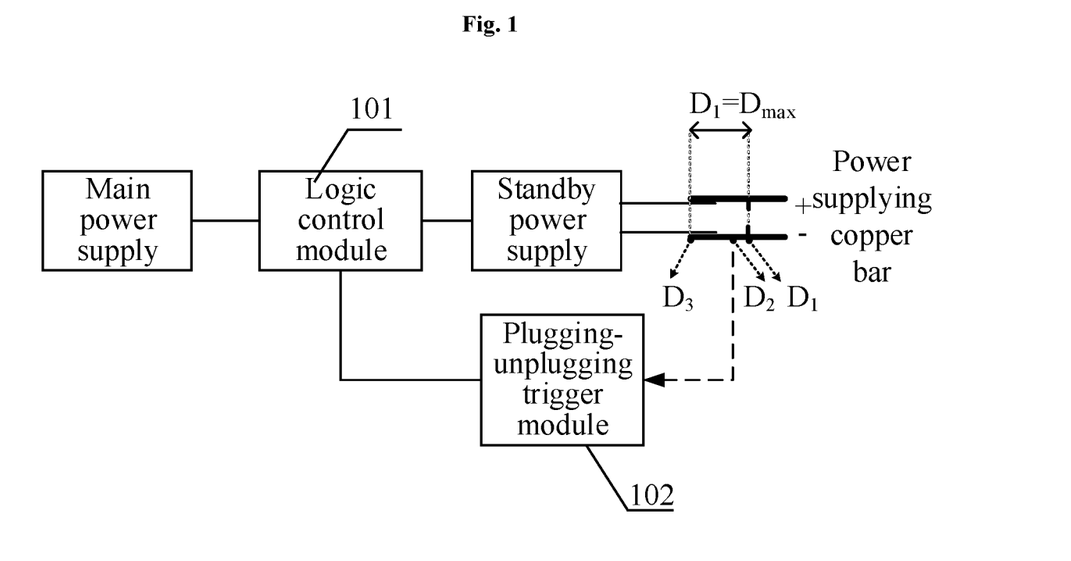
FIG. 1 is a structure block diagram of a protection system for abnormal power down of a child node in a rack-scale server according to the embodiments of the present disclosure.

As illustrated in FIG. 1, the embodiments of the present disclosure provide a protection system for abnormal power down of a child node in a rack-scale server. Power is supplied to each child node of the rack-scale server through a power supplying copper bar. The protection system for abnormal power down includes a logic control module 101 and a plugging/unplugging trigger module 102.

The plugging/unplugging trigger module 102 is configured to detect a contact state, at a second plugging depth, between a power supplying clamp of the child node and the power supplying copper bar through a metal probe, generate a detection signal by conversion, and send the detection signal to the logic control module 101, wherein the second plugging depth is greater than a third plugging depth and not greater than a first plugging depth, the first plugging depth corresponds to a maximum pluggable depth of the power supplying copper bar, and the third plugging depth corresponds to a shallow edge of the power supplying copper bar.

The logic control module 101 is configured to successively turn off a main power supply and a standby power supply of the child node after determining, according to the detection signal, that the power supplying clamp is disengaged from the second plugging depth of the power supplying copper bar and before the power supplying clamp is disengaged from the third plugging depth of the power supplying copper bar, such that the child node executes power down logic of normal power off.

For guarantee of stable contact of power supply in the art, the power supplying clamp (such as a common "crocodile clamp") for the child node is deeply inserted into the power supplying copper bar in normal operation so as to guarantee sufficient contact. Generally, a maximum pluggable depth $D_{max}$ when inserting the power supplying clamp into the power supplying copper bar ranges from 20 mm to 30 mm, that is, there is generally a contact depth of 20-30 mm between the power supplying clamp and the power supplying copper bar.

Therefore, complete pull-out of the child node server undergoes the following process: the power supplying clamp of the child node server is at the position of the maximum pluggable depth $D_{max}$ (which is also the first plugging depth $D_1$ in the embodiments of the present disclosure) of the power supply copper bar at first, then is disengaged from the maximum pluggable depth $D_{max}$ of the power supply copper bar, and finally is separated from the shallow edge (which is also the third plugging depth $D_3$ in the embodiments of the present disclosure) of the power supplying copper bar. In addition, the entire process of separation of the power supplying clamp and the power supplying copper bar generally lasts for more than a few hundreds of milliseconds, or even more than one second. Therefore, the logic control module 101 may control to execute the power down logic of normal power off before complete power down of the system by using the time opportunity during the above separation process.

In some exemplary implementations, the plugging/unplugging trigger module 102 in the embodiments of the present disclosure is configured to detect the contact state, at the second plugging depth $D_2$, between the power supplying clamp of the child node and the power supplying copper bar, that is, once the power supplying clamp of the child node is disengaged from the second plugging depth of the power supplying copper bar, the plugging/unplugging trigger module 102 outputs a corresponding detection signal by conversion. Where, $0=D_3<D_2 \leq D_1=D_{max}$.

Meanwhile, the logic control module 101 in the embodiments of the present disclosure is respectively connected with the main power supply and the standby power supply on a main-board of the child node. Once discovering that the power supplying clamp is disengaged from the second plugging depth of the power supplying copper bar, the logic control module 101 determines that a process of separation of the power supplying clamp and the power supplying copper bar just begins, and the child node is being pulled out but is not completely pulled out, therefore, the main power supply of the child node may be instantly controlled to turn off, and the standby power supply may be controlled to turn off after the main power supply is turned off.

By controlling turn-off of the main power supply earlier than the turn-off of the standby power supply, the power down logic of normal power off is executed. In the design of the power down logic of normal power off, data in the system are automatically stored, thereby effectively avoiding the loss of the system data. Meanwhile, all levels of power supplying networks are power down in order, thereby avoiding the damage to sensitive components due to under-voltage and guaranteeing the safety of circuits.

It is also to be noted that, according to a data processing clock frequency level that may be achieved by a modern electronic device, an operation that a logic control device executes turning off of the main power supply only requires for tens of milliseconds at most, which is far less than one second and even is not on the same order of magnitude. Therefore, from a practical operational level, the logic control device may successively switch off the main power supply and the standby power supply before the power supplying clamp is completely disengaged from the third plugging depth of the power supplying copper bar, in other words, the solution is sufficiently feasible.

It is to be noted that, those having ordinary skill in the art need to reasonably set the second plugging depth $D_2$ in a range of $(0, D_{max}]$. It may be known from the above time opportunity-based detection principle that the larger $D_2$, the more of allowance of total time for successively turning off the main power supply and the standby power supply, thus, $D_2$ is suggested to be not too small.

In some exemplary embodiments, the second plugging depth may be equal to the first plugging depth, that is, $D_2=D_1=D_{max}$. At this time, the metal probe detects the contact state, at the maximum pluggable depth, between the power supplying clamp and the power supplying copper bar. Although the maximum total time allowance may be obtained in this way, a mis-operation is prone to occur.

For example, once the power supplying clamp displaces slightly to disengage from the maximum pluggable depth due to natural shaking in the child node server, the metal probe alarms falsely at this time.

For this purpose, in some other exemplary embodiments, the second plugging depth is slightly smaller than the first plugging depth, for example, $D_2=0.8 D_{max}$. Therefore, a mis-operation interval in the range of $(D_2, D_{max}]$ may be provided for the power supplying clamp. When the power supplying clamp moves in this plugging depth range, a potential output state of the metal probe does not change, thereby avoiding a false alarm and improving an accuracy degree.

It may be seen that, in the protection system for abnormal power down of the child node in the rack-scale server provided in the embodiments of the present disclosure, when the child node server is pulled out by mistake, an initial moment of the process of separation of the power supplying clamp and the power supplying copper bar may be detected based on the metal probe, so that the main power supply and the standby power supply are successively controlled to turn off before complete power down by using the time opportunity during the separation process so as to realize the power down logic of normal power off, thereby effectively avoiding the loss of system data, preventing a reverse voltage caused by abnormal power down from damaging the sensitive electronic components in the system and guaranteeing the safety of system circuits.

In some exemplary embodiments, in addition to the above content, the plugging/unplugging trigger module 102 of the protection system for abnormal power down of the child node in the rack-scale server provided in the embodiments of the present disclosure includes a metal probe and a level switching circuit connected with a first end of the metal probe.

The metal probe is installed in parallel to a power supplying clamp of the child node, and a protruding distance from a second end of the metal probe to a shell is smaller than a protruding distance from the power supplying clamp to the shell, such that, when the power supplying clamp is inserted into the second plugging depth of the power supplying copper bar, the second end of the metal probe is just in contact with a third plugging depth of the power supplying copper bar.

Figure 2:
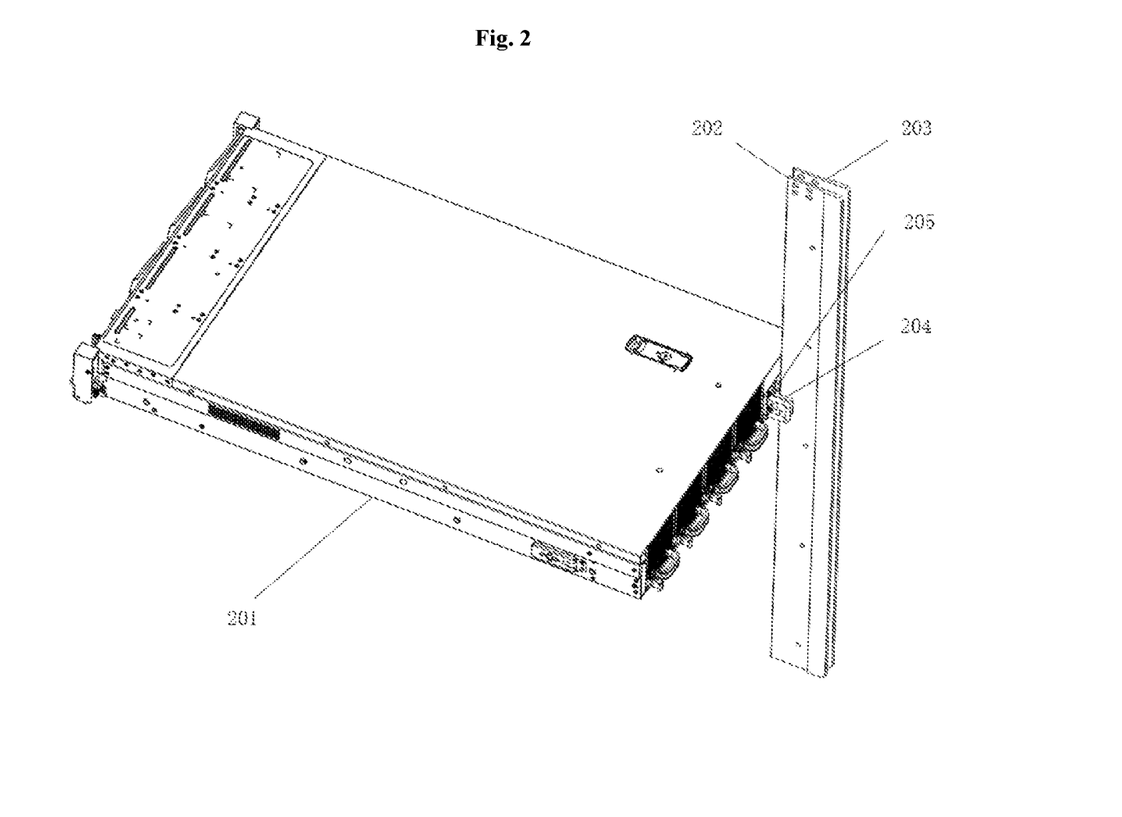
FIG. 2 is an installation schematic diagram of a child node server according to the embodiments of the present disclosure.
Figure 3:
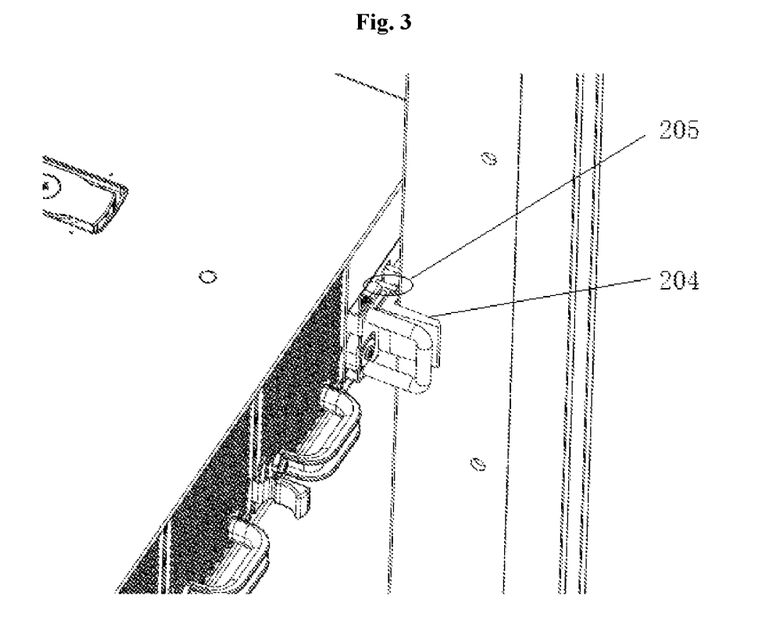
FIG. 3 is a schematic diagram of the state when a power supplying clamp is inserted into a second plugging depth of a power supplying copper bar according to the embodiments of the present disclosure.
Figure 4:
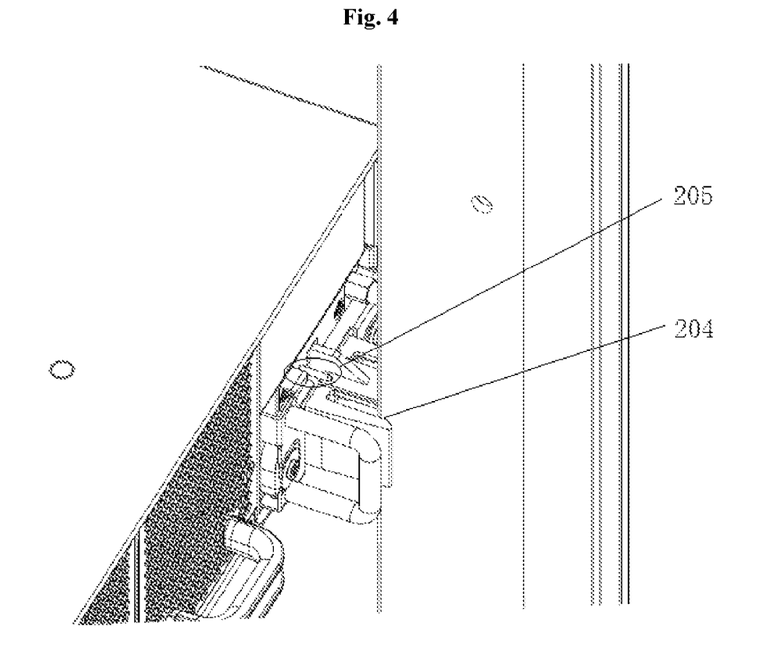
FIG. 4 is a schematic diagram of the state when a plugging depth of a power supplying clamp into a power supplying copper bar is smaller than a second plugging depth according to the embodiments of the present disclosure.

With reference to FIGS. 2-4, FIG. 2 is an installation schematic diagram of a child node server according to the embodiments of the present disclosure; FIG. 3 is a schematic diagram of the state when a power supplying clamp is inserted into a second plugging depth of the power supplying copper bar according to the embodiments of the present disclosure; and FIG. 4 is a schematic diagram of the state when a power supplying clamp is inserted into a certain intermediate depth of the power supplying copper bar according to the embodiments of the present disclosure. In the figures, 201 is a child node server, 202 is a power supply bus-bar of a power supplying copper bar, 203 is a grounding bus-bar of the power supplying copper bar, 204 is the power supplying clamp for the child node server, and 205 is a metal probe.

As illustrated in FIG. 2, the power supplying copper bar is installed vertically and includes a power supply bus-bar and a grounding bus-bar. Two crocodile clamps, that is, the power supplying clamps, are provided in the rear of a shell of the child node server and may be respectively inserted into the power supply bus-bar and the grounding bus-bar for power utilization.

In addition, the metal probe is installed at a position, nearby the power supplying clamp, corresponding to the power supplying copper bar. However, a length of the metal probe protruding the shell is small, when the crocodile clamp is inserted into the second plugging depth of the power supplying copper bar, the metal probe is just in contact with the third plugging depth of the power supplying copper bar, as shown in FIG. 3.

At this time, an output potential on a first end of the metal probe depends on a potential of the contacted power supplying copper bar. In FIG. 3, the metal probe is in contact with the power supply bus-bar in the power supplying copper bar, thus the output potential is a high level. If the metal probe is in contact with the grounding bus-bar in the power supplying copper bar, the output potential is a low level.

When the crocodile clamp is not inserted into the second plugging depth of the power supplying copper bar but is inserted into a certain intermediate depth smaller than the second plugging depth, the metal probe is suspended in the air due to incapability of being in contact with the power supplying copper bar, as shown in FIG. 4. At this time, the output potential on the first end of the metal probe is neither the high level, nor the low level, but a high resistance state potential.

Figure 5:
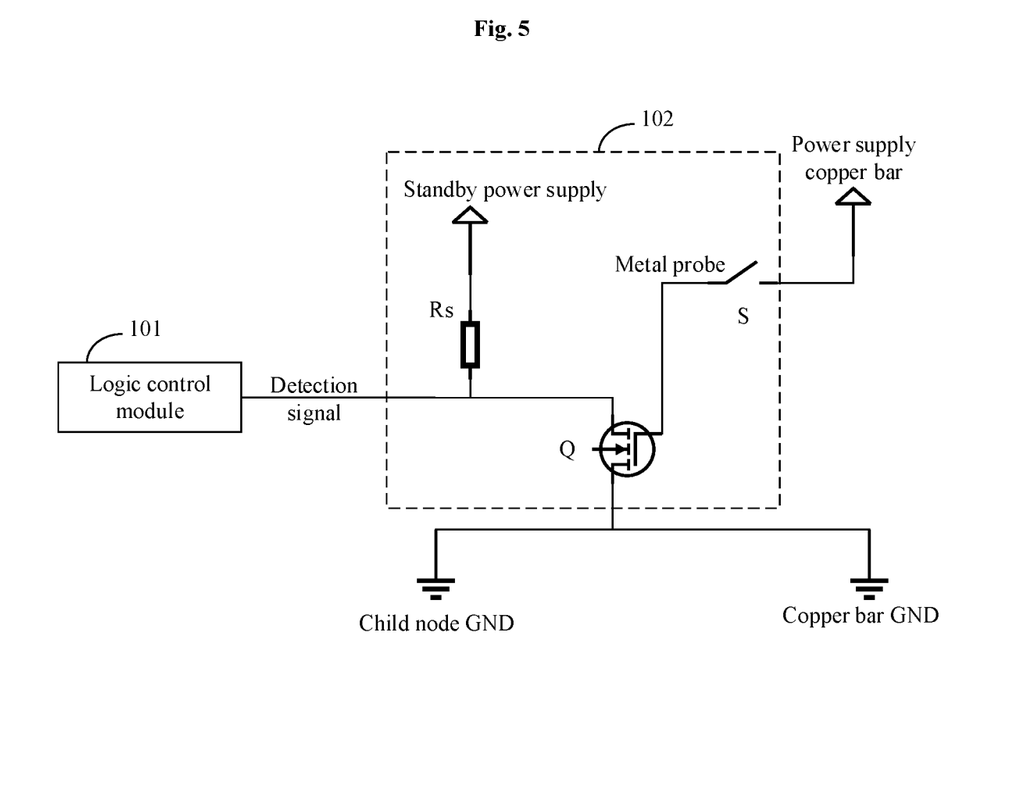
FIG. 5 is a diagram of the circuit structure of a level switching circuit according to the embodiments of the present disclosure.

Referring to FIG. 5, the embodiments of the present disclosure further provide a circuit structure of a level switching circuit.

In some exemplary embodiments, based on the above content, the level switching circuit of the protection system for abnormal power down of the child node in the rack-scale server provided in the embodiments of the present disclosure includes a pull-up resistor Rs and a controllable grounding switch Q which are connected; a common end of the pull-up resistor Rs and the controllable grounding switch Q, as an output end of the level switching circuit, is connected with the logic control module 101; the other end of the pull-up resistor Rs is connected with the standby power supply; and the other end of the controllable grounding switch Q is grounded.

A control end of the controllable grounding switch Q is connected with the first end of the metal probe, such that, when the second end of the metal probe is in contact with a third plugging depth of a power supplying copper bar, the controllable grounding switch Q is switched on; and when the second end of the metal probe is suspended in the air, the controllable grounding switch Q is switched off.

It is to be noted that, for a better understanding, the metal probe is represented by an equivalent switch S in FIG. 5. It is easy to understand that, when the second end of the metal probe is suspended in the air, the controllable grounding switch Q is in an open state, a level state of an output end of the level switching circuit is pulled to a high level by the pull-up resistor Rs; when the second end of the metal probe is in contact with the third plugging depth of the power supplying copper bar, the controllable grounding switch Q is controlled to switch on by an output potential of the metal probe, the level state of the output end of the level switching circuit is pulled to a low level by the controllable grounding switch Q.

Therefore, based on the level switching circuit provided by the embodiments, when a detection signal changes from the low level to the high level, that is, a rising edge occurs, it may be determined that the power supplying clamp of the child node server has disengaged to the second plugging depth of the power supplying copper bar. Furthermore, those having ordinary skill in the art may add a filter anti-shake circuit based on the above level switching circuit so as to further improve the accuracy of signals, which is not limited by the present disclosure.

In some exemplary embodiments, based on the above content, the power supplying copper bar of the protection system for abnormal power down of the child node in the rack-scale server provided in the embodiments of the present disclosure includes a power supply bus-bar and a grounding bus-bar; the metal probe is installed on the shell and corresponding to the power supply bus-bar, such that, when the power supplying clamp is inserted into the second plugging depth of the power supplying copper bar, the second end of the metal probe is just in contact with the third plugging depth of the power supplying copper bar. The controllable grounding switch Q is an NMOS transistor.

In some exemplary implementations, if the metal probe and power supply bus-bar are installed correspondingly, the output potential of the metal probe is the high level when the metal probe is in contact with the third plugging depth of the power supply bus-bar, therefore, the NMOS transistor effective to the high level is correspondingly selected as the controllable grounding switch Q in the embodiments.

Similarly, the metal probe and the grounding bus-bar may be installed correspondingly by those having ordinary skill in the art. When the metal probe is in contact with the third plugging depth of the grounding bus-bar, the output potential of the metal probe is the low level, therefore, a P-channel Metal Oxide Semiconductor (PMOS) transistor effective to the low level is correspondingly selected as the controllable grounding switch Q.

In some exemplary embodiments, based on the above content, the logic control module 101 of the protection system for abnormal power down of the child node in the rack-scale server provided in the embodiments of the present disclosure includes a CPLD on a main-board of the child node.

In some exemplary implementations, the CPLD is an important logic device which is commonly used on the main-board of the server. The CPLD has the advantages of flexible programming, high integration level and wide application range, may implement a large scale of circuit design and is thus widely applied. Therefore, the CPLD on the main-board of the child node server may be adopted as the logic control module 101 in the embodiments.

In some exemplary embodiments, based on the above content, the CPLD in the protection system for abnormal power down of the child node in the rack-scale server provided in the embodiments of the present disclosure is connected with a power button of the child node and is further configured to:

successively turn off the main power supply and the standby power supply after reception of a power off command from the power button.

In some exemplary implementations, a protection mechanism for abnormal power down does not conflict with a power down mechanism of a normal power off operation. Whether after a user presses the power button, or after detecting that the user pulls out the child node server abnormally by mistake, the CPLD in the embodiments successively turns off the main power supply and the standby power supply to execute the power down logic of normal power off, thereby protecting the safety of system data and the safety of components.

Figure 6:
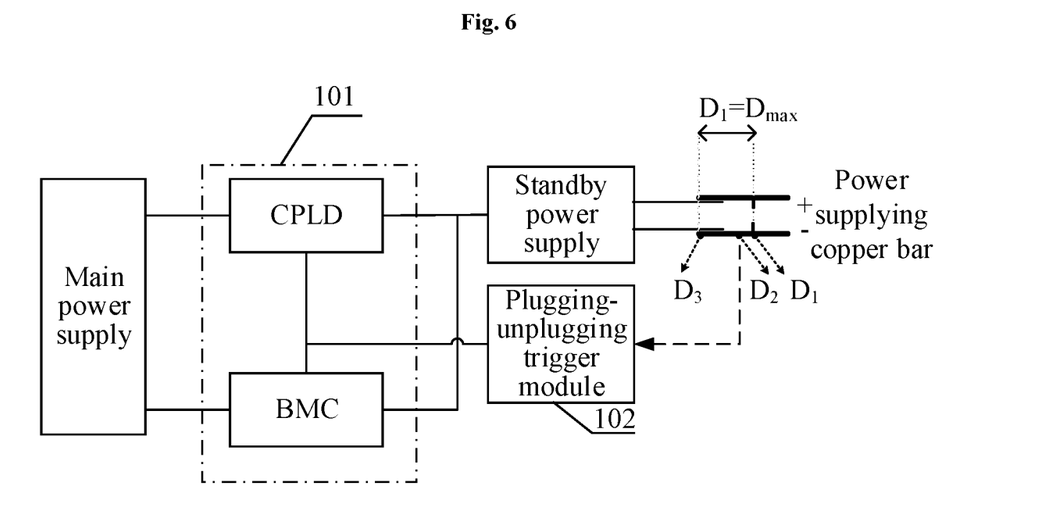
FIG. 6 is a structure block diagram of a protection system for abnormal power down of a child node in a rack-scale server according to the embodiments of the present disclosure.

As illustrated in FIG. 6, in some exemplary embodiments, based on the above content, the logic control module 101 of the protection system for abnormal power down of the child node in the rack-scale server provided in the embodiments of the present disclosure further includes a BMC on the main-board of the child node. The BMC is configured to:

after determining, according to the detection signal, that the power supplying clamp is disengaged from the second plugging depth of the power supplying copper bar according to a detection signal, generate a log record for abnormal power failure at this time.

In some exemplary implementations, the BMC is an important logic device which is used on the main-board of the server. The BMC may monitor a running state of an apparatus through a sensor, perform communication with a system administrator through an independent connection circuit, and perform a base board control operation, including system state monitoring, restarting, re-powering, power failure, firmware upgrade and the like on a machine in a state that the machine is not booted.

In the embodiments, the plugging/unplugging trigger module 102 is connected with the BMC as well. For facilitating subsequent failure analysis, the BMC may instantly record current abnormal power down in a log after determining, according to the detection signal, that the power supplying clamp is disengaged from the second plugging depth of the power supplying copper bar.

Figure 7:
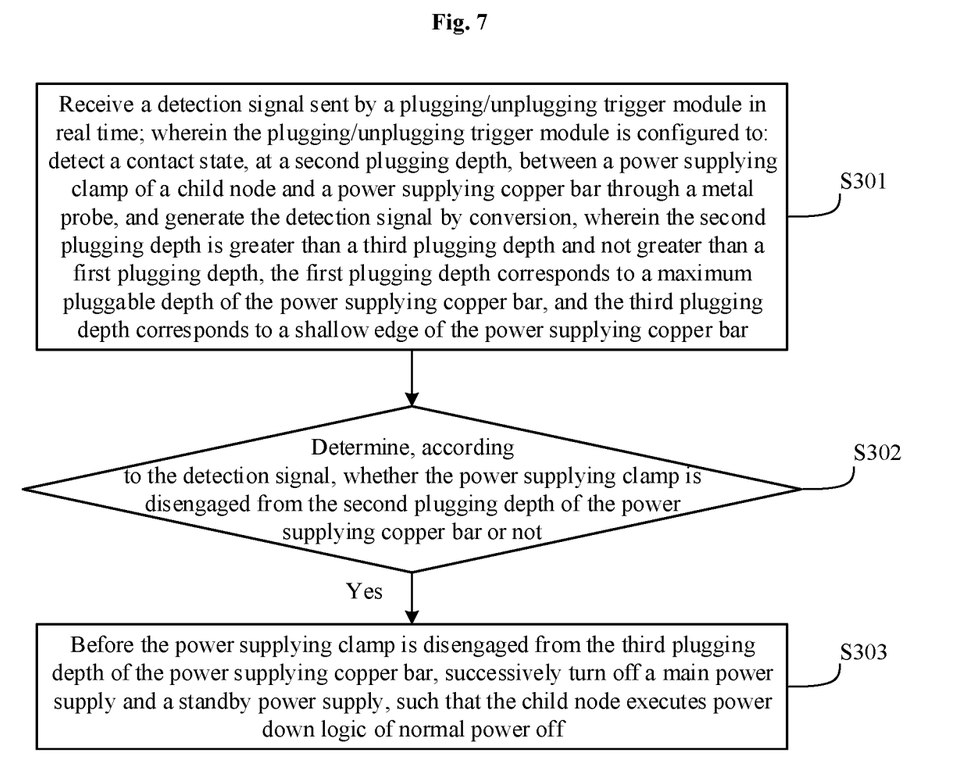
FIG. 7 is a flowchart of a protection method for abnormal power down of a child node in a rack-scale server according to the embodiments of the present disclosure.

As illustrated in FIG. 7, the embodiments of the present disclosure provide a protection method for abnormal power down of a child node in a rack-scale server. Power is supplied to each child node of the rack-scale server through a power supplying copper bar. The method is applied to a logic control module 101 connected with a main power supply and a standby power supply of the child node and mainly includes the following operations.

At S301, a detection signal sent by a plugging/unplugging trigger module 102 is received in real time; the plugging/unplugging trigger module 102 is configured to detect a contact state, at a second plugging depth, between a power supplying clamp of the child node and the power supplying copper bar through a metal probe, and generate a detection signal by conversion.

The second plugging depth is greater than a third plugging depth and not greater than a first plugging depth, the first plugging depth corresponds to a maximum pluggable depth of the power supplying copper bar, and the third plugging depth corresponds to a shallow edge of the power supplying copper bar.

At S302, Whether the power supplying clamp is disengaged from the second plugging depth of the power supplying copper bar or not is determined according to the detection signal.

At 303, before the power supplying clamp is disengaged from the third plugging depth of the power supplying copper bar, the main power supply and the standby power supply are successively turned off, such that the child node executes power down logic of normal power off.

It may be seen that, in the protection system for abnormal power down of the child node in the rack-scale server provided in the embodiments of the present disclosure, when a child node server is pulled out by mistake, an initial moment of a process of separation of the power supplying clamp and the power supplying copper bar may be detected based on the metal probe, and the main power supply and the standby power supply are successively controlled to switch off before complete power down by using the time opportunity during the separation process so as to realize the power down logic of normal power off, thereby effectively avoiding the loss of system data, preventing a reverse voltage caused by abnormal power down from damaging sensitive electronic components in the system, and guaranteeing the safety of system circuits.

The content about the protection method for abnormal power down of the child node in the rack-scale server may refer to detailed introductions of the above protection system for abnormal power down of the child node in the rack-scale server and is not repeated here.

In some exemplary embodiments, based on the above content, in the protection method for abnormal power down of the child node in the rack-scale server according to the embodiments of the present disclosure, a plugging/unplugging trigger module 102 includes a metal probe and a level switching circuit connected with a first end of the metal probe.

The metal probe is installed in parallel to a power supplying clamp of the child node; and a protruding distance from a second end of the metal probe to a shell is smaller than a protruding distance from the power supplying clamp to the shell, such that, when the power supplying clamp is inserted into a second plugging depth of the power supplying copper bar, the second end of the metal probe is just in contact with a third plugging depth of the power supplying copper bar.

In some exemplary embodiments, based on the above content, in the protection method for abnormal power down of the child node in the rack-scale server provided in the embodiments of the present disclosure, the level switching circuit includes a pull-up resistor and a controllable grounding switch which are connected. A common end of the pull-up resistor and the controllable grounding switch, as an output end of the level switching circuit, is connected with a logic control module 101.

The other end of the pull-up resistor is connected with a standby power supply; and the other end of the controllable grounding switch is grounded.

A control end of the controllable grounding switch is connected with the first end of the metal probe, such that, when the second end of the metal probe is in contact with the third plugging depth of the power supplying copper bar, the controllable grounding switch is switched on; and when the second end of the metal probe is suspended in the air, the controllable grounding switch is switched off.

In some exemplary embodiments, based on the above content, in the protection method for abnormal power down of the child node in the rack-scale server provided in the embodiments of the present disclosure, the power supplying copper bar includes a power supply bus-bar and a grounding bus-bar; the metal probe is installed on the shell and corresponding to the power supply bus-bar, such that, when the power supplying clamp is inserted into the second plugging depth of the power supplying copper bar, the second end of the metal probe is just in contact with the third plugging depth of the power supply bus-bar. The controllable grounding switch is an NMOS transistor.

In some exemplary embodiments, based on the above content, in the protection method for abnormal power down of the child node in the rack-scale server provided in the embodiments of the present disclosure, the logic control module 101 includes a CPLD on a main-board of the child node.

In some exemplary embodiments, based on the above content, in the protection method for abnormal power down of the child node in the rack-scale server provided in the embodiments of the present disclosure, the CPLD is connected with a power button of the child node. The method further includes the following operation.

The main power supply and the standby power supply are successively turned off after reception of a power off command from the power button.

In some exemplary embodiments, based on the above content, in the protection method for abnormal power down of the child node in the rack-scale server provided in the embodiments of the present disclosure, the logic control module 101 further includes a BMC on the main-board of the child node. The method includes the following operation.

After determining, according to the detection signal, that the power supplying clamp is disengaged from the second plugging depth of the power supplying copper bar according to a detection signal, the BMC generates a log record for current abnormal power down.

Figure 8:
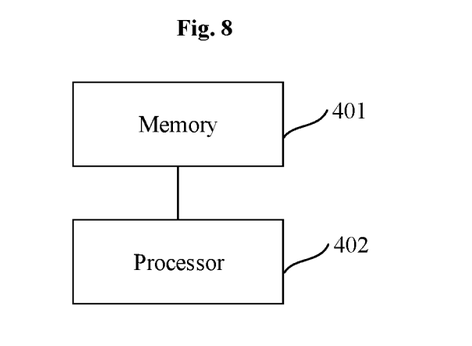
FIG. 8 is a structure block diagram of an electronic apparatus according to the embodiments of the present disclosure.

As illustrated in FIG. 8, the embodiments of the present disclosure provide an electronic apparatus, comprising a memory 401 and a processor 2.

The memory 401 is configured to store a computer program.

The processor 402 is configured to execute the computer program so as to implement the above operations of a protection method for abnormal power down of a child node in a rack-scale server.

Further, the embodiments of the present disclosure further provide a computer-readable storage medium, in which a computer program is stored, and when being executed by a processor, the compute program is configured to cause the processor to implement the above operations of an abnormal power off protection method for a child node in a rack-scale server.

The content about the above electronic apparatus and computer-readable storage medium may refer to detailed introductions of the protection system for abnormal power down of the child node in the rack-scale server and is not repeated here.

Each embodiment in the present disclosure is described in a progressive way, the content highlighted in each embodiment is different from the content of other embodiment. The identical or similar part among the embodiments may refer to each other. As the apparatus disclosed in the embodiment corresponds to the method disclosed in the embodiment, it is described simply, and the related part may refer to descriptions in the method.

It is to be noted that relational terms "first", "second" and the like in the file of the present disclosure are adopted only to distinguish one entity or operation from another entity or operation and not always to require or imply existence of any such practical relationship or sequence between the entities or operations. Terms "include" and "contain" or any other variation thereof are intended to cover nonexclusive inclusions, so that a process, method, object or apparatus including a series of elements not only includes those elements, but also includes other elements that are not clearly listed, or further includes elements intrinsic to the process, the method, the object or the apparatus. Under the condition of no more limitations, an element defined by statement "including a/an" does not exclude existence of another element that is the same in a process, method, object or apparatus including the element.

The above technical solution provided in the embodiments of the present disclosure is described in detail. The principles and implementation modes of the present disclosure are described herein using specific examples, the foregoing description of the embodiments are only used to help the understanding of the method and core concept of the present disclosure. It is to be pointed out that a number of improvements and modifications may be made to the present disclosure by those having ordinary skill in the art without departing from the principle of the present disclosure, and all fall within the scope of protection of the present disclosure.

What is claimed is:

1. A protection system for abnormal power down of a child node in a rack-scale server, wherein power is supplied to each child node of the rack-scale server through a power supplying copper bar, and the protection system for abnormal power down comprises a logic control module and a plugging or unplugging trigger module;

the plugging or unplugging trigger module is configured to detect a contact state, at a second plugging depth, between a power supplying clamp of the child node and the power supplying copper bar through a metal probe, generate a detection signal by conversion, and send the detection signal to the logic control module, the plugging or unplugging trigger module comprises the metal probe and a level switching circuit connected with a first end of the metal probe, the metal probe is installed in parallel to the power supplying clamp of the child node, and a protruding distance from a second end of the metal probe to a shell is smaller than a protruding distance from the power supplying clamp to the shell, such that, when the power supplying clamp is inserted to the second plugging depth of the power supplying copper bar, the second end of the metal probe is just in contact with the third plugging depth of the power supplying copper bar, wherein the second plugging depth is greater than a third plugging depth and not greater than a first plugging depth, the first plugging depth corresponds to a maximum pluggable depth of the power supplying copper bar, and the third plugging depth corresponds to a shallow edge of the power supplying copper bar; and the logic control module is configured to successively turn off a main power supply and a standby power supply of the child node after determining, according to the detection signal, that the power supplying clamp is disengaged from the second plugging depth of the power supplying copper bar and before the power supplying clamp is disengaged from the third plugging depth of the power supplying copper bar, such that the child node executes power down logic of normal power off.

2. The protection system for abnormal power down of the child node in the rack-scale server according to claim 1, wherein the level switching circuit comprises a pull-up resistor and a controllable grounding switch which are connected; a common end of the pull-up resistor and the controllable grounding switch, as an output end of the level switching circuit, is connected with the logic control module;

the other end of the pull-up resistor is connected with the standby power supply; and the other end of the controllable grounding switch is grounded;

a control end of the controllable grounding switch is connected with the first end of the metal probe; when the second end of the metal probe is in contact with the third plugging depth of the power supplying copper bar, the controllable grounding switch is driven to switch on; and when the second end of the metal probe is suspended in the air, the controllable grounding switch is switched off.

3. A The protection system for abnormal power down of the child node in the rack-scale server according to claim 2, wherein the power supplying copper bar comprises a power supply bus-bar and a grounding bus-bar; the metal probe is installed on the shell and corresponding to the power supply bus-bar, such that, when the power supplying clamp is inserted into the second plugging depth of the power supplying copper bar, the second end of the metal probe is just in contact with the third plugging depth of the power supply bus-bar; and the controllable grounding switch is a N-channel Metal Oxide Semiconductor (NMOS) transistor.

4. The protection system for abnormal power down of the child node in the rack-scale server according to claim 1, wherein the logic control module comprises a Complex Programmable Logic Device (CPLD) on a main-board of the child node.

5. The protection system for abnormal power down of the child node in the rack-scale server according to claim 4, wherein the CPLD is connected with a power button of the child node, and is further configured to:

successively turn off the main power supply and the standby power supply after reception of a power off command from the power button.

6. The protection system for abnormal power down of the child node in the rack-scale server according to claim 4, wherein the logic control module further comprises a Baseboard Management Controller (BMC) on the main-board of the child node; the BMC is further configured to:

after determining, according to the detection signal, that the power supplying clamp is disengaged from the second plugging depth of the power supplying copper bar, generate a log record for current abnormal power down.

7. A protection method for abnormal power down of a child node in a rack-scale server, wherein power is supplied to each child node of the rack-scale server through a power supplying copper bar, and the method is applied to a logic control module connected with a main power supply and a standby power supply of the child node, and comprises:

receiving a detection signal sent by a plugging or unplugging trigger module in real time, wherein the plugging or unplugging trigger module is configured to detect a contact state, at a second plugging depth, between a power supplying clamp of the child node and the power supplying copper bar through a metal probe, and generate a detection signal by conversion, the plugging or unplugging trigger module comprises the metal probe and a level stitching circuit connected with a first end of the metal probe, the metal probe is installed in parallel to the power supplying clamp of the child node, and a protruding distance from a second end of the metal probe to a shell is smaller than a protruding distance from the power supplying clamp to the shell, such that, when the power supplying clamp inserted to the second plugging depth of the power supplying copper bar, the second end of the metal probe is just in contact with the third plugging depth of the power supplying copper bar, wherein the second plugging depth is greater than a third plugging depth and not greater than a first plugging depth, the first plugging depth corresponds to a maximum pluggable depth of the power supplying copper bar, and the third plugging depth corresponds to a shallow edge of the power supplying copper bar;

determining, according to the detection signal, whether the power supplying clamp is disengaged from the second plugging depth of the power supplying copper bar or not;

in responsive to determining that the power supplying clamp is disengaged from the second plugging depth of the power supplying copper bar, successively turning off the main power supply and the standby power supply before the power supplying clamp is disengaged from the third plugging depth of the power supplying copper bar, such that the child node executes power down logic of normal power off.

8. A non-transitory computer-readable storage medium, wherein a computer program is stored in the non-transitory computer-readable storage medium, and when being executed by a processor, the computer program is configured to cause the processor to implement operations of a protection method for abnormal power down of a child node in a rack-scale server, wherein power is supplied to each child node of the rack-scale server through a power supplying copper bar, and the method is applied to a logic control module connected with a main power supply and a standby power supply of the child node and comprises:

receiving a detection signal sent by plugging or unplugging trigger module in real time, wherein the plugging or unplugging trigger module is configured to detect a contact state, at a second plugging depth, between a power supplying clamp of the child node and the power supplying copper bar through a metal probe, and generate a detection signal by conversion, the plugging or unplugging trigger module comprises the metal probe and a level switching circuit connected with a first end of the metal probe, the metal probe is installed in parallel to the power supplying clamp of the child node, and a protruding distance from a second end of the metal probe to a shell is smaller than a protruding distance from the power supplying W clamp to the shell, such that, when the power supplying clamp is inserted to the second plugging depth of the power supplying copper bar, the second end of the metal probe is just in contact with the third plugging depth of the power supplying copper bar, wherein the second plugging depth is greater than a third plugging depth and not greater than a first plugging depth, the first plugging depth corresponds to a maximum pluggable depth of the power supplying copper bar, and the third plugging depth corresponds to a shallow edge of the power supplying copper bar;

determining, according to the detection signal, whether the power supplying clamp is disengaged from the second plugging depth of the power supplying copper bar or not;

in responsive to determining that the power supplying clamp is disengaged from the second plugging depth of the power supplying copper bar, successively turning off the main power supply and the standby power supply before the power supplying clamp is disengaged from the third plugging depth of the power supplying copper bar, such that the child node executes power down logic of normal power off.

9. The protection system for abnormal power down of the child node in the rack-scale server according to claim 1, wherein the logic control module is respectively connected with the main power supply and the standby power supply on a main-board of the child node.

10. The protection system for abnormal power down of the child node in the rack-scale server according to claim 1, wherein the second plugging depth is greater than the third plugging depth and less than the first plugging depth, wherein the second plugging depth $D_2$ is equal to the first plugging depth $D_{max}$ multiplied by a value less than 1 and greater than 0.

11. The protection system for abnormal power down of the child node in the rack-scale server according to claim 3, wherein two power supplying clamps are provided in the rear of the shell of the child node and are respectively inserted into the power supply bus-bar and the grounding bus-bar.

12. The protection system for abnormal power down of the child node in the rack-scale server according to claim 3, wherein when the metal probe is in contact with the power supply bus-bar in the power supplying copper bar, an output potential on the first end of the metal probe is a high level.

13. The protection system for abnormal power down of the child node in the rack-scale server according to claim 3, wherein when the metal probe is in contact with the grounding bus-bar in the power supplying copper bar, an output potential on the first end of the metal probe is a low level.

14. The protection system for abnormal power down of the child node in the rack-scale server according to claim 3, wherein when the metal probe is suspended in the air due to incapability of being in contact with the power supplying copper bar, an output potential on the first end of the metal probe is a high resistance state potential.

15. The protection system for abnormal power down of the child node in the rack-scale server according to claim 3, wherein when the second end of the metal probe is suspended in the air, the controllable grounding switch is in an open state, a level state of an output end of the level switching circuit is pulled to a high level by the pull-up resistor; when the second end of the metal probe is in contact with the third plugging depth of the power supplying copper bar, the controllable grounding switch is controlled to switch on by an output potential of the metal probe, the level state of the output end of the level switching circuit is pulled to a low level by the controllable grounding switch.

16. The protection system for abnormal power down of the child node in the rack-scale server according to claim 3, wherein when the metal probe and power supply bus-bar are installed correspondingly, an output potential of the metal probe is a high level when the metal probe is in contact with the third plugging depth of the power supply bus-bar, and an NMOS transistor effective to the high level is correspondingly selected as the controllable grounding switch.

17. The protection system for abnormal power down of the child node in the rack-scale server according to claim 3, wherein when the metal probe and the grounding bus-bar are installed correspondingly, an output potential of the metal probe is a low level when the metal probe is in contact with the third plugging depth of the grounding bus-bar, and a P-channel Metal Oxide Semiconductor (PMOS) transistor effective to the low level is selected as the controllable grounding switch.

18. The protection system for abnormal power down of the child node in the rack-scale server according to claim 6, wherein the plugging or unplugging trigger module is connected with the BMC.

19. The protection method for abnormal power down of the child node in the rack-scale server according to claim 7, wherein in the power down logic of normal power off, data in a system are automatically stored, and all levels of power supplying networks are power down in order.

* * * * *